United States Patent
Chow et al.

(10) Patent No.: US 9,063,766 B2
(45) Date of Patent: Jun. 23, 2015

(54) SYSTEM AND METHOD OF MANIPULATING VIRTUAL MACHINE RECORDINGS FOR HIGH-LEVEL EXECUTION AND REPLAY

(75) Inventors: James Eugene Chow, San Jose, CA (US); Tal Garfinkel, Palo Alto, CA (US); Dominic Lucchetti, Beltsville, MD (US)

(73) Assignee: VMware, Inc., Palo Alto, CA (US)

( * ) Notice: Subject to any disclaimer, the term of this patent is extended or adjusted under 35 U.S.C. 154(b) by 1075 days.

(21) Appl. No.: 13/049,637

(22) Filed: Mar. 16, 2011

(65) Prior Publication Data

US 2012/0239987 A1    Sep. 20, 2012

(51) Int. Cl.
*G06F 9/44* (2006.01)
*G06F 11/00* (2006.01)
*G06F 9/455* (2006.01)
*G06F 11/36* (2006.01)

(52) U.S. Cl.
CPC ........ *G06F 9/45533* (2013.01); *G06F 11/3636* (2013.01); *G06F 11/366* (2013.01)

(58) Field of Classification Search
None
See application file for complete search history.

(56) References Cited

U.S. PATENT DOCUMENTS

| | | | | |
|---|---|---|---|---|
| 6,101,524 A | * | 8/2000 | Choi et al. | 718/102 |
| 8,499,299 B1 | * | 7/2013 | Jakab et al. | 718/102 |
| 2009/0144742 A1 | * | 6/2009 | Subhraveti et al. | 718/104 |
| 2010/0161916 A1 | * | 6/2010 | Thornton et al. | 711/154 |
| 2010/0306578 A1 | * | 12/2010 | Thornton et al. | 714/6 |
| 2011/0029711 A1 | * | 2/2011 | Dhuse et al. | 711/4 |
| 2011/0225466 A1 | * | 9/2011 | Resch et al. | 714/54 |
| 2012/0131559 A1 | * | 5/2012 | Wu et al. | 717/132 |
| 2013/0097484 A1 | * | 4/2013 | Nakamura | 715/234 |

OTHER PUBLICATIONS

Chow et al., "Decoupling Dynamic Program Analysis from Execution in Virtual Environments," In: Proceedings of the USENIX 2008 Annual Technical Conference (2008).*
Chow et al., "Multi-stage Replay with Crosscut," ACM, 2010.*
Narayanasamy et al., "Software Profiling for Deterministic Replay Debugging of User Code," In proceeding of: New Trends in Software Methodologies, Tools and Techniques—Proceedings of the Fifth SoMeT 2006, Oct. 25-27, 2006.*
Russinovich et al., "Replay for Concurrent Non-Deterministic Shared-Memory Applications," ACM 1996.*
Xu et al., "An Aspect-Oriented Approach to Security Requirements Analysis," IEEE, 2006.*

* cited by examiner

*Primary Examiner* — Insun Kang

(57) ABSTRACT

Execution behavior for processes within a virtual machine is recorded for subsequent replay. The execution behavior comprises a detailed, low-level recording of state changes for processes within the virtual machine. The low-level recording is processed via replay to produce a sliced recording that conforms to time, abstraction, and security requirements for a specific replay scenario. Multiple stages of replay may be arbitrarily stacked to generate different crosscut versions of a common low-level recording.

22 Claims, 6 Drawing Sheets

SYSTEM AND METHOD OF MANIPULATING VIRTUAL MACHINE RECORDINGS FOR HIGH-LEVEL EXECUTION AND REPLAY

BACKGROUND

Some virtual machine platforms provide a capability of generating a recording of the execution behavior of an instantiated virtual machine for replay at a later time. The recording is generated by taking an initial snapshot of the complete state of the virtual machine at a certain point in time and recording certain subsequent state changes. The complete state of the virtual machine includes its entire memory, which can comprise multiple gigabytes of data, and its entire device state, including associated mass storage, which can comprise hundreds of gigabytes of data.

One usage model for recording and replay is to facilitate debugging. A session comprises a specific instance of execution for a software application. Replaying a recorded session or sessions replicates any errors that arose during the original execution of the application or applications. Recording and replay enables an application end user to provide to the application vendor a recording that includes errors encountered during the application's execution by the end user. The application vendor can, in turn, replay the application to reproduce identical errors to debug the application.

An abstraction level is commonly selected prior to recording a session. When choosing a conventional record-replay solution, a system administrator must choose, prior to execution, how comprehensively to record each session and at what abstraction level to record. Unfortunately, such choices frequently do not match well with how a recording is ultimately used. A recording may contain too little information to support an end use of replay, or the recording may contain confidential information that should not be released, for example, to a third party software vendor. Security and privacy issues relating to potentially confidential data stored in a snapshot limit the usefulness of conventional recordings. Availability of an appropriately selected abstraction level for a given recording further limits overall usefulness of conventional record-replay techniques.

SUMMARY

A method for generating a replay file for a computer system, according to an embodiment of the invention, includes the steps of reading a unit of replay data from a log file that includes state information, configuring a machine based on the state information included in the unit of replay data, replaying in the machine a segment of executable instructions associated with the unit of replay data to generate output data, determining that the unit of replay data satisfies a selection rule, and recording the output data in the replay file.

A method for generating a replay file for a computer system, according to another embodiment of the invention, includes the steps of reading a unit of replay data from a log file that includes state information, generating from the unit of replay data output data that includes a data structure of a tainted data object, determining that a data object is tainted, redacting contents of the tainted data object from the output data, and recording the output data in the replay file.

Further embodiments of the present invention include, without limitation, a non-transitory computer-readable storage medium that includes instructions that enable a processing unit to implement one or more aspects of the above methods as well as a computer system configured to implement one or more aspects of the above methods.

In some embodiments of the present invention replay log files may be culled using arbitrary filtering techniques without burdening a recording phase of the replay log file, thereby yielding more realistic results from a performance perspective. Furthermore, in some embodiments, private data may be redacted from resulting log files without loss of log file accuracy during a replay or debugging phase.

DETAILED DESCRIPTION

A. Virtualization Platform Architecture

Figure 1:
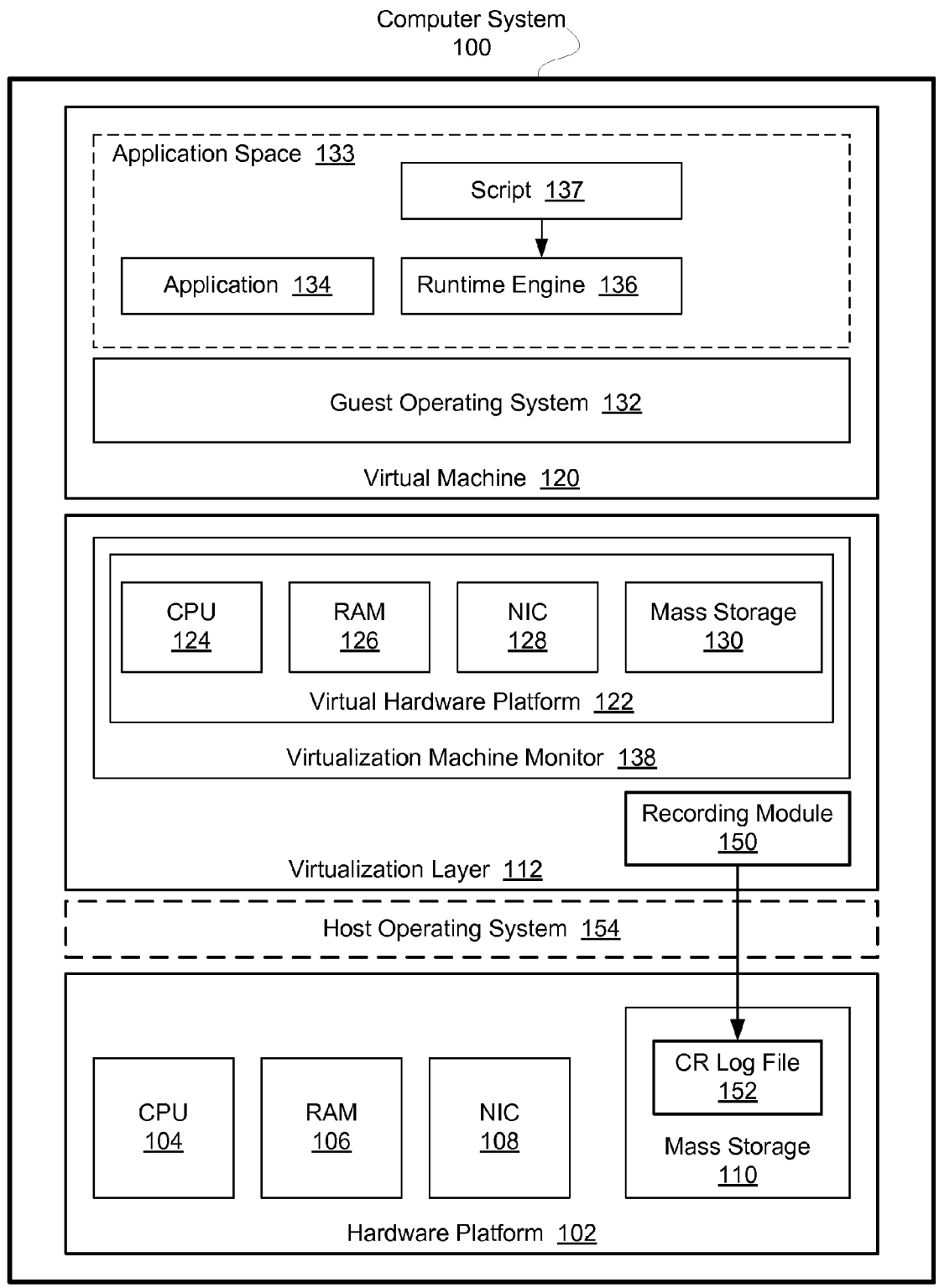
FIG. 1 depicts a block diagram of a computer system that records a log file from which a replay file can be generated according to one embodiment of the present invention.

FIG. 1 depicts a block diagram of a computer system that records a log file from which a replay file can be generated according to one embodiment of the present invention. The computer system 100 may be constructed as a desktop, laptop or server grade hardware platform 102, including different variations of the x86 architecture platform. Such a hardware platform 102 may include a central processing unit (CPU) 104, random access memory (RAM) 106, a Network Interface Card (NIC) 108, mass storage (such as a hard disk drive) 110 and other I/O devices such as a mouse and keyboard (not shown). In one embodiment, virtualization software (or, more generally, virtualization logic) or a virtualization layer 112 (acting as a hypervisor in this context) is installed on top of hardware platform 102 to support a virtual machine execution space within which at least one virtual machine (VM) 120 may be instantiated and executed. Virtualization layer 112 maps the physical resources of hardware platform 102 (e.g., CPU 104, RAM 106, network card 108, hard drive 110, mouse, keyboard, etc.) to a set of corresponding "virtual" (emulated) resources for virtual machine 120. The virtual resources may include virtual CPU 124, virtual RAM 126, virtual NIC 128, and virtual mass storage 130. For example, virtual hardware platform 122 may function as the equivalent of a standard x86 hardware architecture, such that any x86 supported operating system, e.g., MICROSOFT WINDOWS®, LINUX®, SOLARIS® x86, NETWARE®, FREEBSD®, etc., may be installed as a guest operating system 132 in order to facilitate application execution within VM 120. Virtual hardware platform 122 may be considered part of a virtual machine monitor (VMM) 138, which implements the virtual system infrastructure needed to coordinate operations between virtualization layer 112 and virtual machine 120. One example of a virtualization layer 112 that may be used in an embodiment of the invention is the kernel (referred to as VMkernel) which is implemented in VMware's ESX® virtualization product, available from VMware, Inc. of Palo Alto, Calif.

In an alternative embodiment, a host operating system 154 is installed on hardware platform 102. In such an embodiment, the virtualization layer 112 operates above an abstraction level provided by the host operating system 154. The virtualization layer 112 performs similar functions to a hypervisor except that communication from the virtualization layer 112 to the hardware platform 102 is via the host operating system 154 rather than via a direct path to the hardware platform 102. An example of software implementing virtualization layer 112 in this context for a desktop or laptop hardware platform 102 is VMware Workstation™ 6, which is also available from VMware. It should be recognized that the various terms, layers and categorizations used to describe the virtualization components in FIG. 1 may be referred to differently without departing from their functionality or the spirit or scope of the invention.

Guest operating system 132 provides a system abstraction level known as an application space 133. The application space 133 typically provides execution (process), memory, communication, and storage abstractions. An arbitrary application 134, a runtime engine 136 configured to execute a script 137, or any other application may execute within the application space 133. Runtime engine 136 may comprise a Perl language interpreter, configured to read a Perl script and perform corresponding Perl commands within the Perl script. Runtime engine 136 may also comprise a Java language interpreter, configured to read and execute a Java language script, Java virtual machine instructions, or precompiled native machine instructions. In general, a runtime engine may execute language source code, translated byte codes, intermediate codes, compiled codes, or any other technically feasible instruction codes. When an application, such as application 134 is launched in VM 120, guest operating system 132 communicates with virtual CPU 124 to allocate a virtual address space to application 134 and loads the instructions (i.e., code) that execute application 134 into a portion of a virtual address space. This instance of application 134 is known as a "process" of application 134, which operates within the virtual address space. A page table maps the virtual address space into a portion of virtual RAM 126 that is controlled by guest operating system 132. The page table may contain an entry for each mapping of a page of the virtual address space to a page in virtual RAM 126.

The virtual CPU 124, virtual RAM 126, virtual NIC 128, and virtual mass storage 130 are emulated by the virtualization layer 112. Operations performed by the virtualization layer 112 may be monitored and used to create a comprehensive recording log file 152 comprising an initial snapshot of state associated with the VM 120 and a record of each nondeterministic input event. In one embodiment, the initial snapshot of state may include, without limitation, state for the virtual CPU 124, virtual RAM 126, virtual NIC 128, and virtual mass storage 130. Data associated with a given nondeterministic input event is stored in the comprehensive recording log file 152 along with an arrival time for the event. The nondeterministic input event may be received as a result of an arbitrary asynchronous input event, such as a network data packet arrival. In the case of a network data packet arrival, the contents of the network data packet are stored within the comprehensive recording log file 152. Segments of code are executed by the virtualization layer 112 between points in execution delineated by nondeterministic input events. Persons skilled in the art will recognize that the techniques disclosed herein may apply to virtual as well as physically implemented computing systems.

B. Recording and Replay

A recording log, such as comprehensive recording log file 152, comprises information required to fully and uniquely recreate executing state of the VM 120 and virtual hardware platform 122.

During replay, a replay module reads the recording log and re-executes portions of the executable code. The replay module instantiates a virtual machine and configures machine state based on an initial state for the virtual machine. The replay module then re-executes segments of code corresponding to originally executed segments of code. Whenever input is required, the input is read from the recording log. The input may come from any technically feasible source. For example, the input may come from an asynchronously written segment of data in memory. The segment of memory may comprise, for example, a shared memory segment or a destination location for data associated with the input. Because the recording log keeps a precise chronology of input events and corresponding data and state changes, the replay module is able to faithfully reproduce an original session.

In one embodiment of the present invention, a recording module 150 is configured to generate the comprehensive recording log file 152, comprising an initial snapshot and a recording of all inputs, such as non-deterministic inputs. Each input includes at least a data value and an arrival time. The recording module 150 may reside in the virtualization layer 112, the virtual machine monitor 138, or in any technically feasible location within the system architecture of the computer system 100. In one usage model, the recording module 150 generates the comprehensive recording log file 152 on mass storage device 110. Persons skilled in the art will understand that a comprehensive recording log may be generated efficiently and without substantially impacting overall system performance. Other types of log file generation techniques that filter, process, or manipulate event log data can introduce performance burdens during recording and can therefore be less efficient to generate than a comprehensive log file that records all available event log data.

Application level details may be parsed from portions of a replay runtime state for a particular application, based on knowledge of the application. For example, detailed script-level information for runtime engine 136 may be parsed from replay runtime state for the runtime engine 136, given sufficient application knowledge within the replay module. However, building sufficient application knowledge into the replay module to parse application level activity for all possible applications may not be practical or efficient in many scenarios.

One technique for more efficiently recording application level detail is to put the application 134 into a debug or event logging mode, where log data, such as detailed debug data, is transmitted to an API call configured to receive the log data and either save the log data to a designated log file or to discard the log data. In an enabled operating mode, the API call writes the log data to the designated log file. In certain scenarios, generating the designated log file or plural different such log files may significantly degrade performance of the application 134. In a disabled operating mode, the API does not generate the log file, and the log data is discarded, without significant performance degradation of the application 134. During a recording phase, the application 134 may be configured to operate in a debug or event logging mode, but the API call may be configured to operate in a disabled mode for higher execution performance. During replay, the API call may be configured to operate in an enabled mode to trigger actual recording of the designated file (or files). The log file may include any arbitrary application data, including debug data. This technique causes the application 134 to execute code segments that delineate high-level activity and create the potential for logging the high-level activity, but without significant additional processing burden from actually logging the high-level activity to a separate log file. During replay, log output data from the application is used to generate an application level log file, which may include an arbitrarily detailed reconstruction of application level execution.

A more general technique for efficiently recording application level activity for replay involves enabling an application to mark certain functions that are optional to the correct operation of the application and disabling the optional functions during a recording phase to reduce performance and storage burdens associated with the optional functions. The disabled commands may then be enabled during a replay phase. In one embodiment, an application programming interface (API) is exposed to applications within the application space 133. The API implements a mechanism for marking commands within an application to be disabled during a recording phase. Commands marked via the API as disabled for recording may be skipped during the recording phase, but may be later executed during a replay phase. In this way, certain functions that are optional to the correct operation of a given application may be disabled during recording and subsequently enabled during replay to reproduce a complete representation of application behavior, but without associated performance burdens during recording. One example of an optional function is generating and storing an application level debug log file. By marking functions related to generating the debug log file as disabled for recording, no debug log file is generated during recording. However, the related functions may be enabled during replay to generate the debug log file. Other optional functions may include data consistency checking and many forms of caching that are frequently irrelevant to debugging an application. This technique for selective execution enables applications to run at more realistic performance levels during a recording phase, without losing debug information during replay.

In one embodiment, the API calls related to marking functions to be disabled during recording are implemented as backdoor calls to the virtualization layer 112. For example, one API call may mark a function to be disabled during recording, indicating that the function call should only be performed during replay. The virtualization layer 112 responds by either executing or ignoring the marked command, depending on whether the application is executing in a recording phase or a playback phase. Commands may be marked using a source code assert construct that facilitates a backdoor call to the virtualization layer 112. Persons skilled in the art will recognize that different techniques may be used to implement such a backdoor pathway, and that any such technique is within the scope and spirit of the present invention.

C. Slicing a Recording Log

Figure 2:
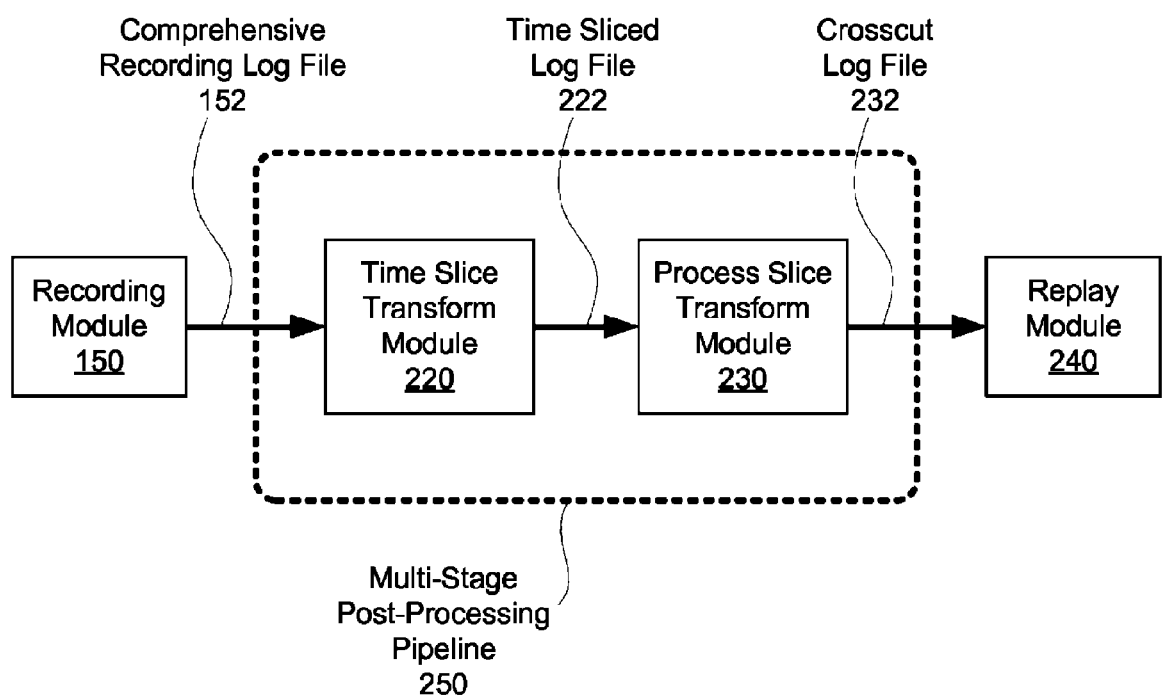
FIG. 2 illustrates a multi-stage post-processing pipeline of transforms configured to generate a crosscut log file suitable for targeted replay, according to one embodiment of the invention.

FIG. 2 illustrates a multi-stage post-processing pipeline 250 of transforms configured to generate a crosscut log file 232 suitable for targeted replay, according to one embodiment of the invention. The crosscut file 232 includes replay data generated from two slicing transforms performed on comprehensive recording log file 152. Each slicing transform selectively records replay state information based on specified slicing transforms. As described previously, the comprehensive recording log file 152 comprises an initial snapshot and a recording of all inputs, such as non-deterministic inputs. Transform modules 220, 230 perform a replay operation on a respective input log file to generate a transformed output log file comprising replay data that satisfies specified transform criteria. Replay data outside the scope of the specified transform criteria is not included in the output log file. Each transform module 220, 230 generates an output log file conforming to a crosscut file format. Each transform module 220, 230 generates output log data that enables execution of replay data that satisfies the specified transform criteria.

The recording module 150, residing in the virtualization layer 112 of FIG. 1, generates the comprehensive recording log file 152. Time slice transform module 220 replays the comprehensive recording log file 152 to generate a time sliced log file 222, comprising a snapshot for the start of a specified time window, and substantially all previously recorded replay information to be performed within the time window. Replay information occurring outside the time window is culled. Process slice transform module 230 replays the time sliced log file 222 to generate crosscut log file 232, comprising a snapshot at the start of the specified time window, and replay information to be performed within the specified process scope. Process scope is illustrated below in FIG. 3A. Replay information occurring outside the time window and specified process scope is culled. A common log file format may be implemented among the comprehensive recording log file 152, time sliced log file 222, and crosscut log file 232. With the common log file format defining both the input and output of each transform, an arbitrary chain of transforms may be developed for processing a given log file. Alternatively, each transform module may generate an arbitrary log file format that may be parsed for replay by another transform module within an arbitrary chain of transform modules. In one embodiment, certain replay data, such as results from specific system calls, may be derived during replay.

In certain scenarios, a log file needs to be replayed by a third party who should not have access to all machine state represented in the log file. For example, a log file may include confidential passwords, encryption/decryption keys, and potentially other forms of confidential information that should be redacted from the log file destined to the third party. Data redaction involves culling certain data from a generated log file. Either or both transform modules 220, 230 may perform data redaction. Alternatively, redaction may be performed by a separate transform module (not shown). Any technically feasible redaction techniques may be applied within the framework of the multi-stage post-processing pipeline 250, however two exemplary redaction techniques are described herein. The first redaction technique involves removing specified strings, such as literally defined strings, regular expressions, or any other technically feasible means for specifying a pattern when generating an output log file from an input log file. The specified strings may include passwords or other confidential data that should be redacted. When a specified string is encountered during replay, the specified string is sliced from a replay output log file. In one embodiment, redaction of the specified string is performed by slicing a time span, corresponding to when the specified string exists in replay state, from the replay output log file. Slicing the time span from the replay output log file is analogous to a general time slice operation. Related code may also be sliced. Only the results of processing the specified string need to be saved as part of a snapshot, but the redacted string need not be saved.

A second redaction technique involves tagging confidential information at the application level. In one embodiment, data objects are tagged (tainted) via an API call, which is configured to identify a data object as containing confidential information. The API call may be implemented as a backdoor call to the virtualization layer 112. An assert construct may be implemented to tag (taint) a data object for redaction. The assert construct facilitates a backdoor call to the virtualization layer 112. When a tainted item of data is encountered during execution, the span of time where the tainted item of data is handled in execution state is sliced from the replay output log file. Similarly, when a copy of the tainted item of data, or an item of data derived from the tainted item of data is encountered during execution, the span of time where the copy or derived item of data is handled in execution state is sliced from the replay output log file. The slice operation is analogous to a general time slice operation.

Either redaction technique may be applied initially when the comprehensive recording log file 152 is generated, or at any transform stage within the multi-stage post-processing pipeline 250. Persons skilled in the art will recognize that different techniques may be used to implement such a backdoor pathway, and that any such technique is within the scope and spirit of the present invention. Furthermore, any technically suitable replay module 240 may be employed to replay crosscut log file 232, which may contain only replay information conforming to an intersection of slice transforms performed by the time slice transform module 220 and process slice transform module 230.

Figure 3A:
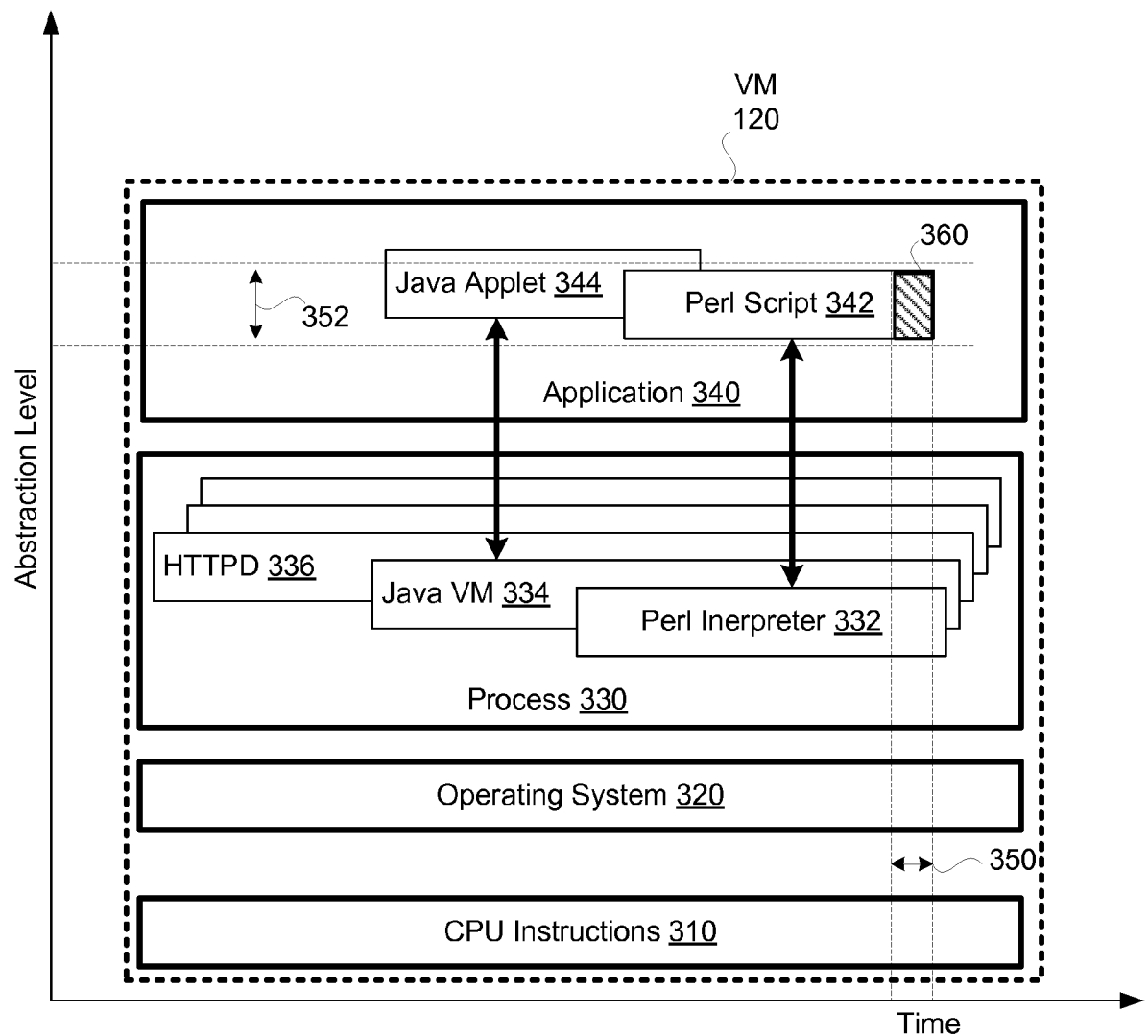
FIG. 3A illustrates time slicing and abstraction level slicing to generate a crosscut log file for targeted replay.

FIG. 3A illustrates time slicing and abstraction level slicing to generate a crosscut log file for targeted replay. Virtual machine 120, executing in conjunction with virtual hardware platform 122, can be viewed as a system model of increasingly abstract layers. The lowest, most detailed (least abstract) layer comprises CPU instructions 310, which model low-level computations and data manipulation operations that form all higher levels of abstraction. The operating system 320 creates abstracted models of process execution, memory, and other system resources that are presented to processes in a process layer 330. Each process within the process layer 330 is presented with a process model, memory model, and resource model. As shown, plural processes may coexist in the process layer 330 of virtual machine 120, including a Perl interpreter 332, a Java virtual machine 334, an HTTP daemon (HTTPD) 336, and others.

An application layer 340 represents tasks performed by applications within the process layer 330. As shown, Java applet 344 and Perl script 342 execute within the application layer 340. In this example, Perl script 342 can be seen as executing lines of Perl script associated with the application layer 340. However, the Perl interpreter 332 is actually executing CPU instructions 310 within a process abstraction level above operating system 320. While a lot of computational activity is required at many levels to execute lines of Perl script 342, a Perl developer is typically only interested in their Perl script 342 and related Perl state, not the underlying CPU instructions needed to execute the Perl script 342. In a practical scenario, the Perl script 342 may interact asynchronously with other processes within the VM 120, or via a network connection to processes executing on another virtual or physical machine. In a replay scenario, any underlying computation of other processes interacting with the Perl script 342 may or may not be important to replaying the Perl script 342. However, any asynchronous input received during a recording phase needs to arrive at a chronologically precise point in any subsequent replays of the Perl script. Therefore, each log file includes at least timing information, although the log file may not necessarily include anything else about other processes.

In the above example, a time window 350 is used to slice a comprehensive recording log file, such as comprehensive recording log file 152. A time sliced log file, such as time sliced log file 222 is generated from comprehensive recording log file 152. Additionally, a process scope window 352 is used to slice the time sliced log file to generate a crosscut log file, such as crosscut log file 232. The crosscut file includes a crosscut extent 360 of the original comprehensive recording log file. The crosscut extent 360 may be substantially smaller than the original comprehensive recording log file. As described previously, the crosscut extent 360 can also be redacted of confidential or sensitive information.

The above examples illustrate the concept of multi-stage processing of a recording log file. Time slicing and process slicing are examples of different types of slicing techniques, however, persons skilled in the art will understand that further and additional slicing techniques may be implemented without departing from the scope and spirit of the present invention.

Figure 3B:
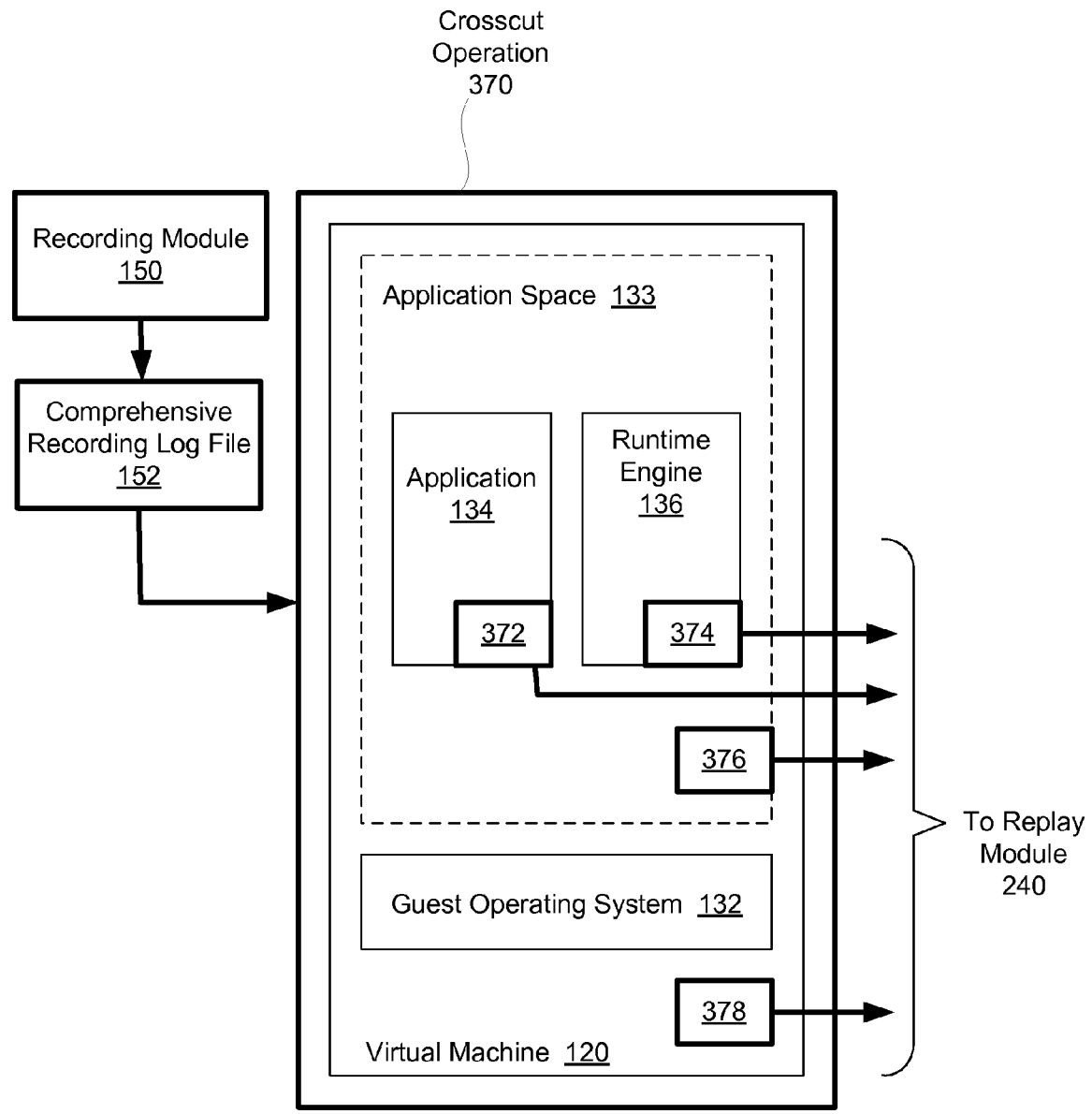
FIG. 3B illustrates log files generated for different abstraction levels within a virtual machine, according to one embodiment of the present invention.

FIG. 3B illustrates log files 372-378 generated for different abstraction levels within virtual machine 120 of FIG. 1, according to one embodiment of the present invention. Comprehensive recording log file 152 is generated from the recording module 150 within VM 120. The comprehensive recording log file 152 is processed by crosscut operation 370 to generate one or more log files 372-378. The crosscut operation 370 comprises plural slicing transforms, as described in the multi-stage post-processing pipeline 250 of FIG. 2. Each log file 372-378 corresponds to a particular crosscut extent 360.

Log file 378 includes instruction level detail, but may be, for example, time sliced. Furthermore, comprehensive recording log file 152 may include tainted data objects, or tainted strings and any related data may be redacted from log file 378. Therefore, while log file 378 includes detailed machine level information, no tainted data is represented. Log file 376 includes instruction level detail for one or more processes within application space 133. Log file 376 may be sliced to include a specific one process or set of processes, a certain span or spans of time, or according to any other technically feasible slicing transform.

Log file 372 may include a debug trace file generated by application 134. As described previously, the application 134 may be configured to operate in a debug mode, but not actually generate log file 372 during a recording phase. Similarly, log file 374 may include a debug trace file generated by runtime engine 136. Data from tainted data objects or strings may be redacted from log files 372-378 using either technique described previously, or using any technically feasible technique.

One or more of the log files 372-378 may be generated by the crosscut operation 370. One or more of the log files 372-378 may be read and replayed by a replay module, such as replay module 240 of FIG. 2.

Figure 3C:
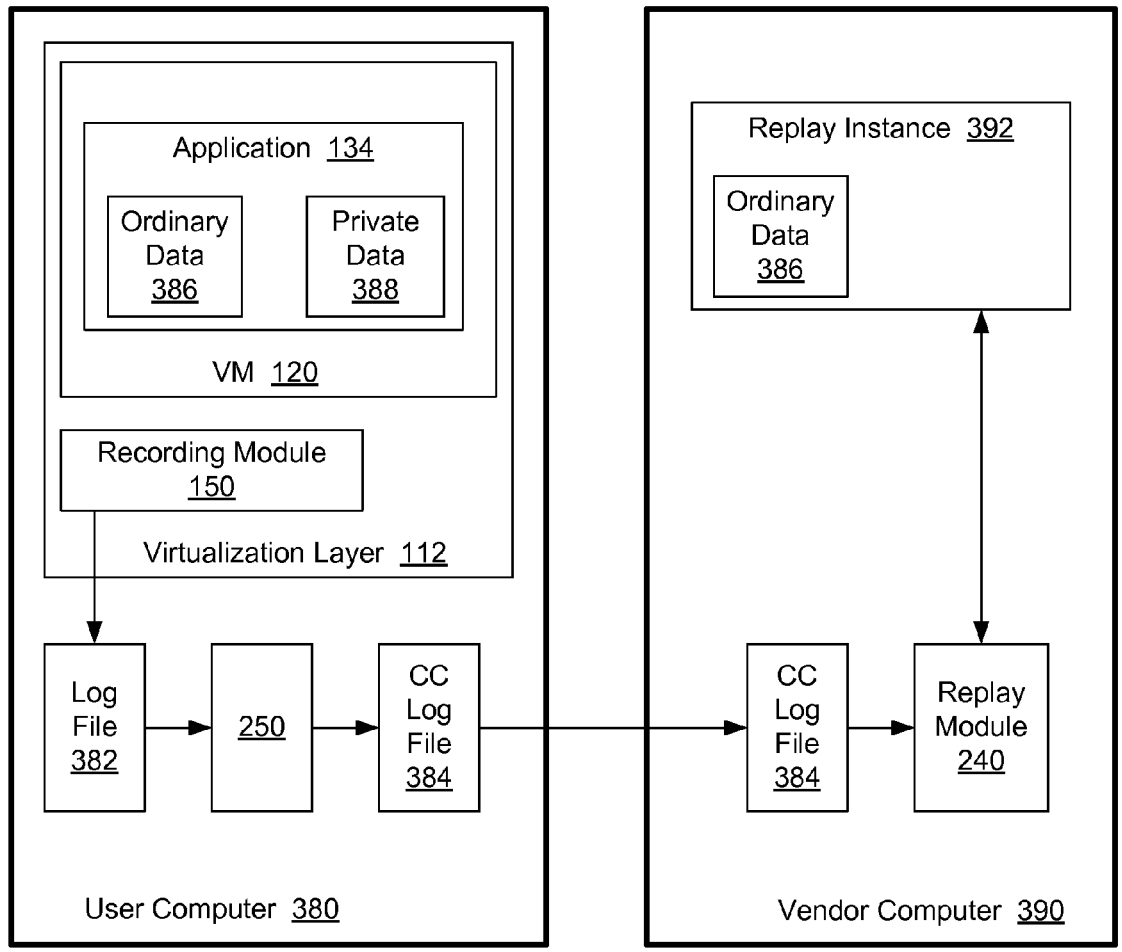
FIG. 3C illustrates a usage model for redaction of private data within a log file, according to one embodiment of the present invention.

FIG. 3C illustrates a usage model for redaction of private data 388 within a log file 382, according to one embodiment of the present invention. A user computer 380, such as an instance of computer system 100, is configured to execute application 134 of FIG. 1 and to generate log file 382, such as comprehensive recording log file 152 of FIG. 1, via recording module 150 residing in the virtualization layer 112. Log file 382 may be of an arbitrary abstraction level. The log file 382 may be processed according to the multi-stage post-processing pipeline 250 to generate crosscut (CC) log file 384. Private data 388 is deemed inappropriate for transmission or storage outside of user computer 380. For example private data 388 may contain proprietary passwords, data, and the like. Therefore, private data 388 is redacted either when log file 382 is generated or when crosscut log file 384 is generated. Private data 388 may be redacted according to either technique described previously, or according to any technically feasible technique, without departing from the scope and spirit of the present invention.

The crosscut log file 384 is transmitted to a vendor computer 390. The replay module 240 reads the crosscut log file 384 to create a replay instance 392 of application 134. The replay instance 392 includes ordinary data 386 from application 134, but does not contain private data 388 from application 134.

Figure 4:
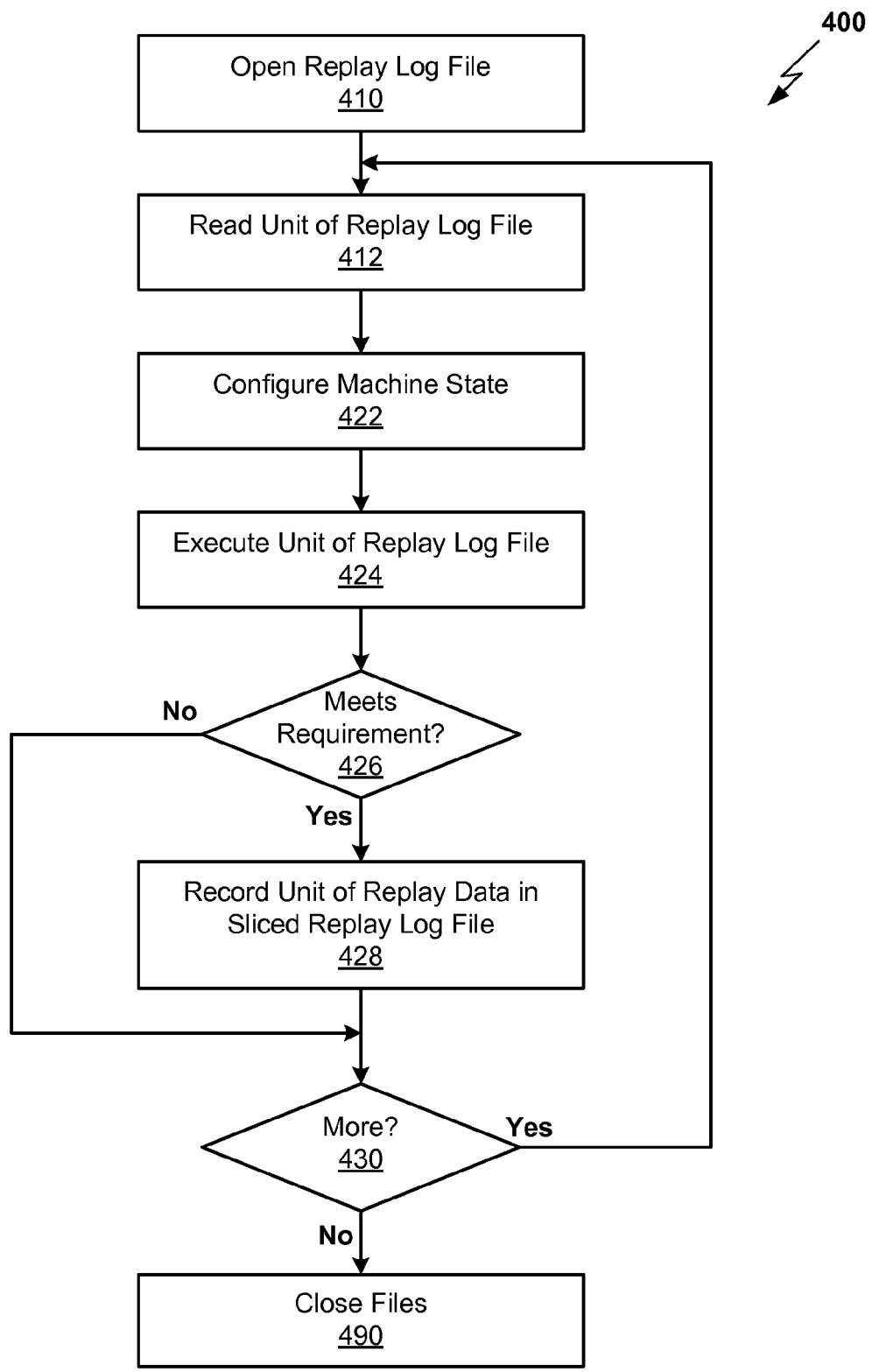
FIG. 4 is a flow diagram of method steps, performed by a transform module, for generating a sliced recording log file, according to one embodiment of the invention.

FIG. 4 is a flow diagram of method steps 400, performed by a transform module, for generating a sliced recording log file, according to one embodiment of the invention. Although the method steps are described in conjunction with the system of FIGS. 1-3C, it should be understood that there are other systems in which the method steps may be carried out without departing from the scope and spirit of the present invention.

The method begins in step 410, where the transform module, such as time slice transform module 220 or process slice transform module 230, opens a replay log file. The replay log file may reside in any data storage media, including volatile and non-volatile storage media. In step 412, the transform module reads a unit of the replay log file, which may comprise snapshot data and nondeterministic input data. Snapshot data is used to establish replay machine state at a particular elapsed execution time. Nondeterministic input data represents asynchronously arriving input data, such as a network data packet arriving at an arbitrary time, or a user mouse click event. In one embodiment, the transform module reads an entire semantically complete unit of the replay log file, parses the unit, and analyzes the unit for scope in time, abstraction level, and process identity. The transform module may further analyze the unit of the replay log file using any other technically feasible techniques for determining slice requirements.

In step 422, the replay module configures machine state for replay. The machine state may be a previous machine state or an initial snapshot of machine state from the replay log file. The snapshot may be used to establish initial machine state. In step 424, the replay module executes a code segment associated with the previously read unit of the replay log file. The code segment advances machine state for the virtual machine until an interruption is required, such as receiving input data.

If, in step 426, the executed unit of the replay log file meets a specified slice requirement, then the method proceeds to step 428. The specified slice may comprise a time window, abstraction level, process scope, data scope, or any other technically feasible criteria for slicing, or any combination thereof. Data that is tainted (marked for redaction) does not meet the slice requirement. A tainted data object may remain in place within a memory image of processor state, however the contents of the tainted data object need to be redacted. In one embodiment, a tainted data object is redacted by performing a time slice for a span of time corresponding to when contents of the tainted data object reside in playback state. In an alternative embodiment, data residing within the tainted data object is written with at least a portion of a predetermined string, such as a sequence of zeros. In certain embodiments, multiple different slice requirements may be specified and determined in step 426. A timestamp within the unit of the replay log file may be compared against the time window to determine whether the executed unit of replay log file meets a certain specified slice requirement. A process identifier within the unit of the replay log file may be compared against a process scope specification to determine whether the executed unit of replay log file meets a corresponding slice requirement. Other attributes, such as abstraction level, may be similarly tested with respect to the executed unit of replay log file to determine whether a given specified slice requirement is satisfied.

In step 428, the replay module records machine state in a sliced replay log file. In one mode of operation, tainted data (marked for redaction) is not written to the sliced replay log file.

If, in step 430, there is more replay information in the replay log file, then the method proceeds back to step 412. Otherwise, the method terminates in step 490, where the replay module closes the replay log file and the sliced replay log file.

Returning to step 426, if the executed unit of the replay log file does not meet a specified slice requirement, then the method proceeds to step 430.

In sum, a technique is disclosed for generating a specifically targeted crosscut log file of arbitrarily narrow scope from a broader, general recording log file generated to include comprehensive machine state. A multi-stage post-processing pipeline may be implemented for generating the crosscut log file having a specifically targeted extent. At each stage, a transform module within the multi-stage post-processing pipeline performs a replay operation on a previous recording log file and performs a slicing transform to narrow the overall extent for a resulting sliced log file. A final crosscut transform generates the crosscut log file, which may be used to replay targeted aspects of the original general recording file.

D. Additional Embodiments

The various embodiments described herein may employ various computer-implemented operations involving data stored in computer systems. For example, these operations may require physical manipulation of physical quantities usually, though not necessarily, these quantities may take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system. Computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs) CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

In addition, while described virtualization methods have generally assumed that virtual machines present interfaces consistent with a particular hardware system, persons of ordinary skill in the art will recognize that the methods described may be used in conjunction with virtualizations that do not correspond directly to any particular hardware system. Virtualization systems in accordance with the various embodiments, implemented as hosted embodiments, non-hosted embodiments, or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless of the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

We claim:

1. A method for generating a replay file from a log file in a computer system, the method comprising:
   reading a unit of replay data from the log file that includes state information;
   configuring a machine using the state information included in the unit of replay data;
   replaying in the machine a segment of executable instructions associated with the unit of replay data to generate output data;
   during said replaying, determining whether or not a selection rule is satisfied by comparing a process identifier within at least one of the unit of replay data, state of the machine, and the output data to a specified process identifier; and
   responsive to determining that the selection rule is satisfied, recording the output data in the replay file for subsequent replaying.

2. The method of claim 1, wherein said determining further includes: comparing a time stamp within the examined data to a specified time window.

3. The method of claim 1, wherein said replaying includes:
   loading a segment of executable instructions that is bounded by an external event and executing the instructions up to the external event.

4. The method of claim 3, wherein the external event comprises non-deterministic inputs.

5. The method of claim 1, wherein said recording includes:
   redacting data from a tainted data object.

6. The method of claim 5, further comprising:
   determining that a data object is tainted based on a string value stored within the data object.

7. The method of claim 5, further comprising:
   determining that a data object is tainted based on a marking associated with the data object.

8. A non-transitory computer-readable storage medium comprising instructions which, when executed by a computing device, causes the computer device to carry out the steps of:
   reading a unit of replay data from a log file that includes state information;
   configuring a machine using the state information included in the unit of replay data;
   replaying in the machine a segment of executable instructions associated with the unit of replay data to generate output data;
   during said replaying, determining whether or not a selection rule is satisfied by comparing a process identifier within at least one of the unit of replay data, state of the machine, and the output data to a specified process identifier; and
   responsive to determining that the selection rule is satisfied, recording the output data in a replay file for subsequent replaying.

9. The non-transitory computer-readable storage medium of claim 8, wherein said determining comprises the step of:
   comparing a time stamp within the examined data to a specified time window.

10. The non-transitory computer-readable storage medium of claim 8, wherein said computing comprises the step of:
    loading a segment of executable instructions that is bounded by an external event and executing the instructions up to the external event.

11. The non-transitory computer-readable storage medium of claim 10, wherein the external event comprises non-deterministic inputs.

12. The non-transitory computer-readable storage medium of claim 8, wherein said recording comprises the step of: redacting data from a tainted data object.

13. The non-transitory computer-readable storage medium of claim 8, comprising instructions which, when executed by a computing device, causes the computer device to carry out the further step of: determining that a data object is tainted based on a string value stored within the data object.

14. The non-transitory computer-readable storage medium of claim 8, comprising instructions which, when executed by a computing device, causes the computer device to carry out the further step of: determining that a data object is tainted based on a marking associated with the data object.

15. The non-transitory computer-readable storage medium of claim 8, comprising instructions which, when executed by a computing device, causes the computer device to carry out the further step of:

during said replaying, establishing an initial set of tainted data objects based on the executable instructions.

16. A method for generating a replay file from a log file in a computer system, the method comprising:

reading a unit of replay data from the log file that includes state information;

configuring a machine using the state information included in the unit of replay data;

replaying in the machine a segment of executable instructions associated with the unit of replay data to generate output data;

during said replaying, determining whether or not a selection rule is satisfied by comparing a process abstraction level associated with the unit of replay data to a specified abstraction level; and responsive to determining that the selection rule is satisfied, recording the output data in the replay file for subsequent replaying.

17. The method of claim 16, wherein said determining further includes: comparing a time stamp within the examined data to a specified time window.

18. The method of claim 16, wherein said replaying includes: loading a segment of executable instructions that is bounded by an external event and executing the instructions up to the external event.

19. The method of claim 18, wherein the external event comprises nondeterministic inputs.

20. The method of claim 16, wherein said recording includes: redacting data from a tainted data object.

21. The method of claim 20, further comprising:

determining that a data object is tainted based on a string value stored within the data object.

22. The method of claim 20, further comprising:

determining that a data object is tainted based on a marking associated with the data object.

* * * * *